Jan. 16, 1940.  E. WEINBERGER  2,187,187
COFFEE INFUSER
Filed Jan. 24, 1938
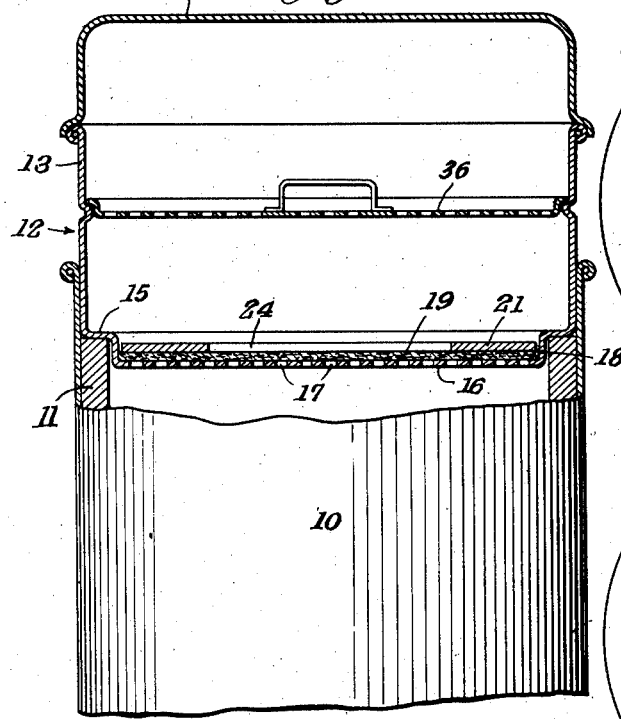
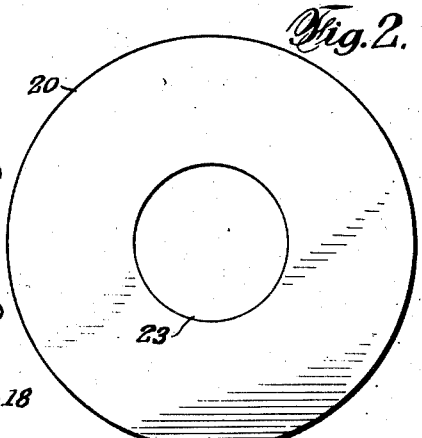
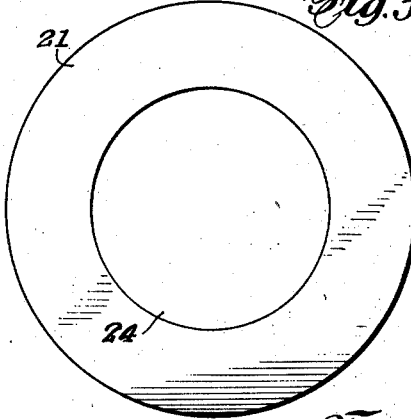
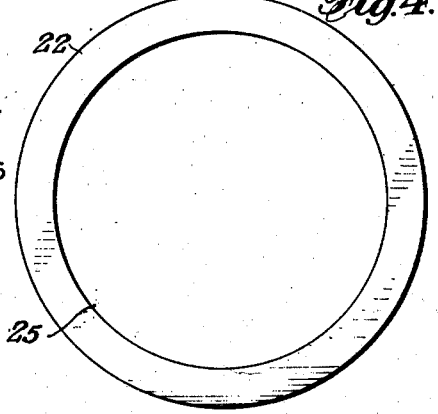
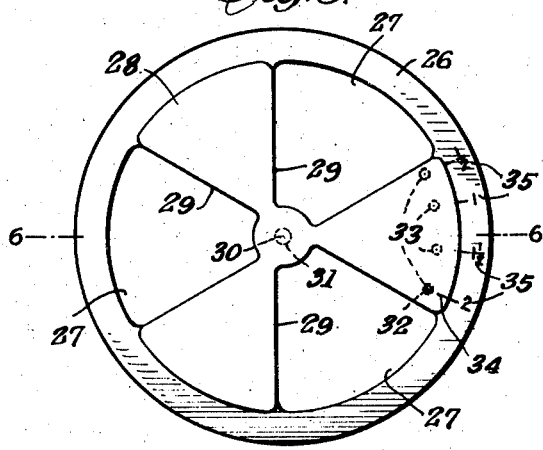
INVENTOR
EMANUEL WEINBERGER
BY
ATTORNEY Patented Jan. 16, 1940

2,187,187

UNITED STATES PATENT OFFICE 2,187,187

COFFEE INFUSER

Emanuel Weinberger, New York, N. Y.

Application January 24, 1938, Serial No. 186,637

2 Claims. (Cl. 53—3)

This invention relates to coffee makers and more particularly to improvements in the coffee-holding receptacle which rests on the pot or urn.

In restaurants and other establishments in which large capacity coffee makers are used, coffee is made in fixed predetermined amounts, i. e., for a certain capacity urn, a specified amount of ground coffee is placed in the coffee receptacle in relation to the number of gallons of water in the urn. In urns as at present constructed, it is not possible to make a lesser amount of coffee than capacity without special timing and careful watching during the infiltration period. Moreover, the coffee will vary from the desired standard unless expertly done.

The present invention, therefore, seeks to provide an improved coffee maker wherein a desired amount of coffee may be made at full capacity of the urn or at any desired proportion thereof.

The invention also seeks to provide a coffee maker in which small amounts of coffee may be made as rapidly and as efficiently as larger amounts.

In carrying out the invention, it is proposed to provide means in the form of binder plates which are placed upon the coffee filter and to form these plates with openings varying in size to control the infiltration period in accordance with the amount of ground coffee placed in the urn receptacle. As at present conceived, these binder plates may either be separate adapters selectively used, or in the form of two associated portions adapted to be relationally adjusted so the infiltration openings may be varied to suit conditions.

With the foregoing in mind, the invention may be realized in several forms of its embodiment as illustrated in the accompanying drawing which should be considered exemplary only of the invention.

In the drawing:

Fig. 1 is a partial elevational, partial sectional view of the upper portion of a coffee maker incorporating features of the invention.

Figs. 2, 3, and 4 are plan views of binder plates selectively used for brewing varying amounts of coffee.

Fig. 5 is a plan view of a binder plate assembly incorporating adjusting means for varying the filter opening.

Fig. 6 is a sectional view taken on the line 6—6 of Fig. 5.

Referring to the drawing in greater detail, the coffee maker in the usual manner comprises an urn 10 having disposed therein a crock 11 and fitted with a coffee grounds receptacle generally designated 12. In the present form the receptacle comprises a container 13 fitted with a cover 14, and provided with a shoulder 15 adapted to seat upon the top edge of the crock 11. In this manner the receptacle is supported in the urn.

The bottom wall 16 of the receptacle is preferably formed with a multiplicity of holes or perforations 17 and between said bottom wall and the shoulder 15 the receptacle is formed with an imperforated annulus 18. Thus the seat or pocket is formed in the bottom of the receptacle 13.

Upon the bottom 16 there is placed a filter 19, made in the usual manner of either filter paper or filter cloth. As contemplated in this invention, one of several adaptor plates, such as shown in Figs. 2, 3, and 4, and designated 20, 21, and 22, may be placed over the filter 19, as shown in Fig. 1. It will be noted that these plates or filter binders are flat and are preferably made of hard, stiff material such as aluminum, and are of sufficient weight to press down upon and firmly hold the filter in position against the bottom of the receptacle. When in position, the binder covers the filter against contact of water and coffee grounds and the essence formed thereby, except at that portion of the filter which is exposed through the opening 23 of the binder 20, the opening 24 of the binder 21, and the opening 25 of the binder 22. Thus, when the binder 20 having the smallest opening, is employed, a relatively small amount of the filter is exposed in filtration, and successively larger portions of said filter are so exposed when binders having successively larger openings are so employed.

From the foregoing it is apparent that when an amount of coffee commensurate with the full capacity of the urn is to be brewed, the binder plate having the largest opening will be employed to expose the greatest portion of the filter to the passage therethrough of the coffee essence formed when hot water is poured over the coffee grounds placed in the receptacle upon the filter and binder plate. When a lesser amount of coffee than the full capacity of the urn is desired, one of the binder plates having a smaller opening will be used, the size of the opening being proportional to the amount of coffee grounds placed in the receptacle.

It is apparent from the above that under the second mentioned conditions, should a binder plate having too large an opening be used, the infiltration period would be too rapid for the small amount of coffee grounds and the coffee essence would thus be weak. It would then be necessary to draw some of this weakly brewed coffee from the urn, pour it again over the grounds in the receptacle to extend the period of infiltration. This process would require careful watching and would naturally result in brews which vary in flavor, strength, and aroma.

In employing the binder plates as above indicated, a single infiltration period only is necessary, said period being controlled by the size of the opening in the selected binder plate used for the amount of coffee desired.

Another manner of obtaining the results above described is shown in Figs. 5 and 6, wherein a binder plate 26 having one or more openings 27, is associated with a valving plate 28 having notches or openings 29 commensurately formed with the openings 27. As shown, the valving plate may be formed with a central projecting pin 30 disposed in a central opening 31 in the binder plate so that said valving plate may be rotated in relation to said opening plate upon their common axis. In order to insure definite relational positioning of the valving plate and the binder plate, a pin 32 may be provided on said valving plate, said pin being adapted to enter selectively any of the openings 33 provided in the binder plate. Thus, when positioned as shown, the openings 27 are fully uncovered to expose the largest surface of the filter 19 positioned therebeneath, and when the pin 32 is placed in any of the other openings 33, lesser portions of the openings 27 are uncovered to expose commensurately lesser portions of the filter. As a guide to the user, an index mark 34 may be placed on the valving plate to be read in association with the appropriate markings or indicia 35 on the binder plate. The two plates 26 and 28, while definitely associated when in use, may be readily separated for thorough cleansing.

In the usual manner, the receptacle may be provided with a perforated water spreader 36 which is positioned upon a seat 37 above that portion of the receptacle in which the coffee grounds are disposed.

From the foregoing it is apparent that an improved and simple coffee maker has been provided and while two forms of the invention have been disclosed, skilled persons may seek to practice the invention in other ways. For this reason the prior art rather than the instant disclosure should form the basis of interpretation of the scope of the invention, as claimed.

What I claim as new and desire to secure by Letters Patent, is:

1. In a coffee maker, a coffee grounds receptacle having a pocketed seat and a perforated bottom wall, a filter positioned in said seat upon said bottom wall, and means for selectively exposing a different proportional area of said filter to the contact of a commensurate amount of coffee grounds placed in said receptacle, said means comprising a binder plate removably positioned in said seat and upon the filter, said plate having a plurality of openings and a central hole, means for varying the effective size of said openings, said means comprising a valving plate having a central pin, and adapted to be positioned in said seat in relation to said binder plate with its pin in the said hole, said valving plate having portions adapted to cover portions of said mentioned openings, and means for determining the effective size of said openings in relation to the amount of coffee grounds in the receptacle, said last-mentioned means including a second pin on the valving plate, and a plurality of recesses in the binder plate selectively engageable by said second pin.

2. In a coffee maker, a coffee grounds receptacle having a pocketed seat and a perforated bottom wall, a filter positioned in said seat upon said bottom wall, means for selectively exposing a different proportional area of said filter to the contact of a commensurate amount of coffee grounds placed in said receptacle, said means comprising a binder plate removably positioned in said seat and upon the filter, said plate having a plurality of openings, means for varying the effective size of said openings, said means comprising a valving plate adapted to be positioned in said seat in relation to said binder plate and having portions adapted to cover portions of said mentioned openings, and means for determining the effective size of said openings in relation to the amount of coffee grounds in the receptacle, said last-mentioned means including a pin on the valving plate and a plurality of recesses in the binder plate selectively engageable by said pin.

EMANUEL WEINBERGER.